United States Patent [19]
Funk et al.

[11] Patent Number: 5,996,409
[45] Date of Patent: Dec. 7, 1999

[54] ACCELERATION SENSING DEVICE

[75] Inventors: Karsten Funk; Franz Laermer, both of Stuttgart; Bernhard Elsner, Kornwestheim; Wilhelm Frey, Stuttgart, all of Germany

[73] Assignee: Robert Bosch GmbH, Stuttgart, Germany

[21] Appl. No.: 09/064,495

[22] Filed: Apr. 22, 1998

[30] Foreign Application Priority Data

May 10, 1997 [DE] Germany ............... 197 19 780

[51] Int. Cl.⁶ .............. G01C 19/00; G01P 15/08
[52] U.S. Cl. ................................. 73/504.04
[58] Field of Search .............. 73/504.03, 504.04, 73/504.02, 510, 511, 514.01, 514.02

[56] References Cited

U.S. PATENT DOCUMENTS

| | | | |
|---|---|---|---|
| 4,784,237 | 11/1988 | Condne et al. ............ | 73/514.02 |
| 5,168,756 | 12/1992 | Hulsing, II ................ | 73/511 |
| 5,226,321 | 7/1993 | Varnham et al. .......... | 73/514.02 |
| 5,241,861 | 9/1993 | Hulsing, II ................ | 73/504.04 |
| 5,249,465 | 10/1993 | Bennett et al. ............ | 73/514.02 |
| 5,339,690 | 8/1994 | Bar-Avi ..................... | 73/504.04 |
| 5,341,682 | 8/1994 | Hulsing, II ................ | 73/504.04 |
| 5,557,046 | 9/1996 | Hulsing, II ................ | 73/504.04 |
| 5,831,164 | 11/1998 | Reddi et al. ............... | 73/514.01 |

FOREIGN PATENT DOCUMENTS

| | | |
|---|---|---|
| 195 00 800 A1 | 12/1995 | Germany . |
| 44 31 478 A1 | 3/1996 | Germany . |
| 195 23 895 A1 | 1/1997 | Germany . |

Primary Examiner—Richard A. Moller
Attorney, Agent, or Firm—Kenyon & Kenyon

[57] ABSTRACT

An acceleration sensing device includes a rotational speed sensor which is mounted on a substrate and detects rotational speed, at least one oscillating structure with a deflectable seismic mass, and an acceleration sensor that detects linear acceleration and has at least one additional seismic mass which is suspended on flexible elements so that it can be deflected. The seismic masses of the two sensors are deflected independently of one another.

18 Claims, 2 Drawing Sheets

ACCELERATION SENSING DEVICE

FIELD OF THE INVENTION

The present invention relates to an acceleration sensing device with a rotational speed sensor which is mounted on a substrate and detects rotational speed; it has at least one oscillating structure including a seismic mass that can be deflected.

BACKGROUND INFORMATION

German Patent No. 195 00 800 describes a rotational speed sensor having seismic masses in a spring suspension on a substrate so they can be deflected under the effect of acceleration. In addition, the acceleration sensor has analysis devices for detecting acceleration-induced deflection of the seismic masses. For this purpose, the seismic masses are suspended so that deflection by any interfering acceleration, especially linear acceleration, is suppressed. The rotational speed sensor is used to detect Coriolis acceleration in particular.

German Patent No. 44 31 478 describes an acceleration sensor having a seismic mass which is suspended on flexible elements and can be deflected by the action of acceleration. An electrode mounted on the seismic mass is moved relative to a stationary electrode, so the capacitance of the resulting capacitor changes due to acceleration. The change in capacitance is detected by measurement. The sensor is used for detection of linear acceleration.

Finally, an acceleration sensor which is designed as a Coriolis rotational speed sensor is described in German Patent No. 195 23 895 (a later publication). In one embodiment, the Coriolis rotational speed sensor is also designed for detection of linear acceleration. To do so, an additional electronic position controller is assigned to an oscillating structure which is formed by seismic masses and is suspended so that it can move with rotary oscillation, and the position controller detects and damps the linear acceleration acting on the oscillating structure. This electronic position controller is formed by comb structures arranged on the oscillating masses to engage with additional comb structures, so that capacitances between the two comb structures can be measured by applying a voltage. When the oscillating structure is deflected due to linear acceleration, the distance between the individual fingers of the comb structures changes, resulting in a change in capacitance which is detected by the electronic position controller. By changing the voltage applied to the comb structures, it is possible to regulate the distance between the comb structures to a predetermined setpoint using the electrostatic effect. At the same time, the voltage level used for the distance control supplies information regarding the magnitude of the linear acceleration acting on the oscillating structure.

One disadvantage of the acceleration sensor described in German Patent No. 195 00 800 is that linear acceleration cannot be detected because linear acceleration is actually suppressed or attenuated.

Furthermore, the acceleration sensor described in German Patent No. 44 31 478 can detect only linear acceleration. Therefore, it is not suitable when both linear acceleration and Coriolis acceleration are to be detected.

One disadvantage of the Coriolis rotational speed sensor described in German Patent No. 195 23 895, which is supposed to detect linear acceleration at the same time, is that the amplitude of the rotary oscillation is several times greater than the respective perpendicular amplitude of the oscillation of the comb structure of the position controller. The amplitude of the rotary oscillation is on the order of 10 to 30 μm, and the amplitude of the oscillation of the comb structure of the position controller is on the order of 1 nm. Thus, the oscillation of the comb structure is superimposed on the rotary oscillation, so that the signal for the electronic position controller of the comb structure is also influenced by the rotary oscillation. This makes it difficult to use the electronic position controller signal for an accurate determination of linear acceleration. However, for certain applications of acceleration sensors, ability to accurately determine both linear acceleration and non-linear acceleration, e.g., Coriolis acceleration, is required.

SUMMARY OF THE INVENTION

The acceleration sensing device according to the present invention contains a rotational speed sensor which is mounted on a substrate and detects rotational speed. Having at least one oscillating structure including a deflectable seismic mass offers the advantage over the related art that an acceleration sensor which detects linear acceleration is also provided. Having at least one additional seismic mass suspended deflectably on flexible elements, the seismic masses of the two sensors are deflected independently of one another, so that both a linear acceleration and a sudden rotational movement, e.g., of a motor vehicle, can be recorded accurately. It is therefore possible to provide the acceleration sensing device as a roll-over sensor for use in motor vehicles. It may provide information for a controller on the basis of which the controller can deploy an airbag and/or a seatbelt tensioner and/or other safety equipment when there is a vehicle rollover, for example.

Furthermore, analysis devices are also provided for each sensor to supply output information as a function of the deflection of the seismic masses.

In a preferred embodiment of the acceleration sensing device, means are provided for processing the output information supplied by the analysis devices, in particular capacitive analysis devices. Specifically, a processing device, in particular an electronic filter element, which is preferably designed as a low-pass filter element, is provided for the acceleration sensor. The time constant T of the low-pass filter is $1 s \leq T_f \leq 30 s$, preferably $T_f = 10 s$. Due to the fact that the output signal of the acceleration sensor is averaged over the low-pass filter with a long time constant, acceleration signals resulting from vehicular movement, e.g., vibration and/or bumping due to a poor roadway surface, are advantageously suppressed because this acceleration has a much higher frequency, namely, several times 10 Hz up to the kHz range. Due to this processing of the output signal of the acceleration sensor, the gravitational field is measured in an advantageous manner and averaged over long time constants. The resulting measurement signal reflects the average position information on the vehicle. It is thus possible to ascertain whether the vehicle is still standing on its wheels on the average or whether it is already on its side or has turned over. However, since acceleration such as that resulting from vibrations, bumps or rapid changes in position is suppressed by the long filter time constant, there cannot be any detection of a sudden onset of a roll-over.

The present invention provides for the use of a rotational speed sensor with an angular integrator element for this purpose. The output signal of the rotational speed sensor is processed suitably by another processing device, preferably an integrator element, which is linked to a high-pass filter in particular. A high-pass filter is to be provided because only the signals of the rotational speed sensor are to be sent to the integrator element. Direct voltages (DC offsets) cause ramping of the integrator element up to a saturation state. The time constant Th of the high-pass filter is 1 s≦$T_h$≦100 s.

Thus if a motor vehicle is tilted about its longitudinal axis, e.g., when turning, the oscillating structure of the rotational speed sensor is deflected with a rotational speed by the same angle of inclination. Thus, in a rotational movement, the rotational speed indicates the angle traversed per unit of time. In deflection, the oscillating structure changes from a rotary oscillating movement into a tilting oscillating movement. The output signal of the rotational speed sensor, i.e., the rotational speed dα/dt, which is sent through the high-pass filter and then through the integrator element, yields the angle α by angular integration:

$$\alpha = \int_T \Omega \, dt = \int_T (d\alpha/dt) \cdot dt$$

which thus yields the exact degree of inclination of the motor vehicle out of the horizontal. The high-pass filter then removes DC offsets, as mentioned above. The integrator element may have a resistor connected in parallel with the capacitor in the feedback branch. For the angle information, however, the initial position of the motor vehicle, i.e., the angle of inclination of the motor vehicle about its longitudinal axis, must be known. This "initial condition" supplied by the low-pass-filtered acceleration sensor signal. Thus, while the slow output signal is supplied accurately by the acceleration sensor, the rotational speed sensor can accurately record a rapid change in position such as that occurring at the start of a roll-over, for example. The actual angle of inclination is thus obtained from the initial position of the vehicle, determined by the acceleration sensor, and from the rapid change in position detected by the rotational speed sensor.

In addition, the processed output information of the rotational speed sensor and the acceleration sensor may be supplied to an analyzer unit, with one analyzer unit being provided for each sensor. However, an embodiment of the analyzer unit which samples the output information of the sensors in multiplex operation is preferred.

In one advantageous embodiment of the present invention, the acceleration sensing device is designed with a micromechanical surface structure. A 2-chip design may be provided, where the micromechanical sensors are provided in the first chip, and the complete electronic analyzer is accommodated in a second separate chip. Preferably, however, both the acceleration sensing device and the analyzer unit are completely integrated into one chip, with the "additive integration technology" being used in an especially preferred embodiment. Additive integration technology refers to a method whereby first a microelectronic circuit is produced on a substrate, e.g., silicon. Then a sacrificial layer is applied to the microelectronic circuit on which a metallic layer is formed by sputtering. This layer is composed of chromium with copper applied to it. Next, with the help of the sputtered layer, micromechanical components, for example, are produced in a lost polymer mold in an electroplating process and then they are exposed.

DETAILED DESCRIPTION

Figure 1:
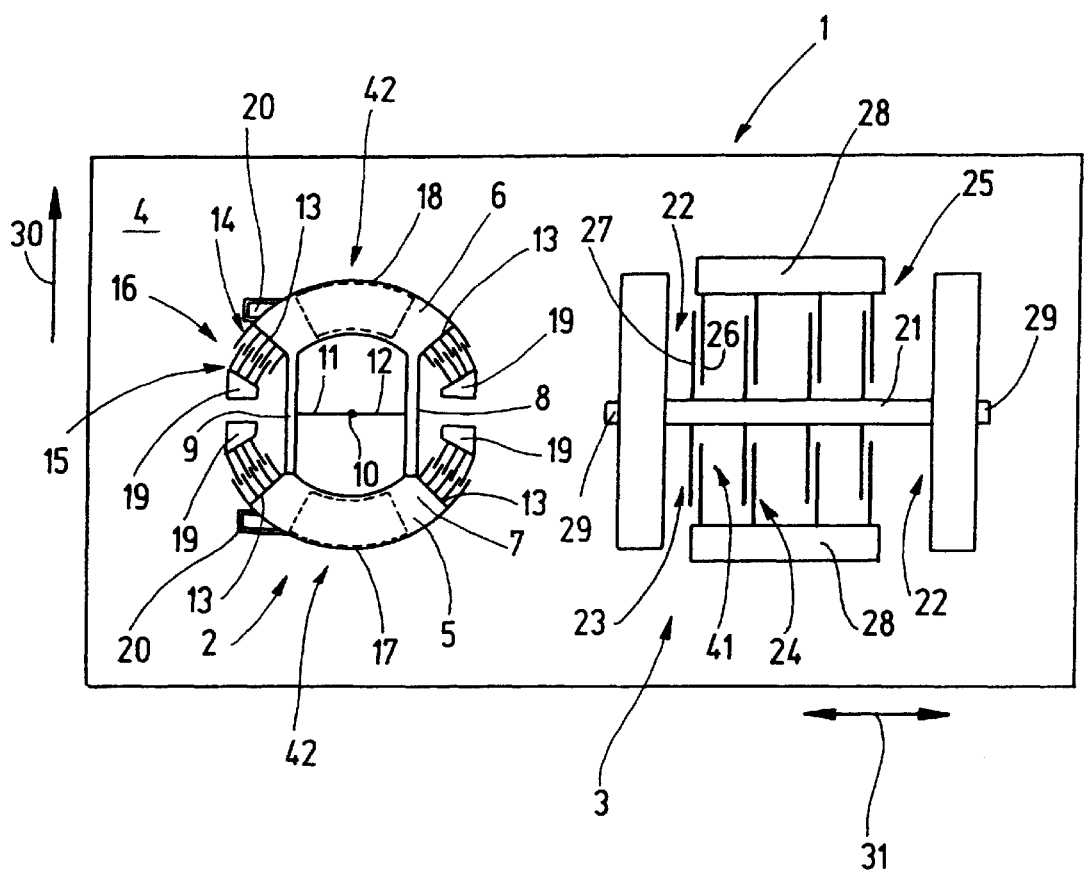
FIG. 1 shows a top view of one embodiment of an acceleration sensing device.

FIG. 1 shows an acceleration sensing device 1 which has a rotational speed sensor 2 and an acceleration sensor 3 which senses linear acceleration, with the two sensors accommodated on one substrate 4. Rotational speed sensor 2 includes an oscillating structure 5 formed by seismic masses 6 and 7, which are rigidly connected by connecting webs 8 and 9. The one-piece oscillating structure 5 thus formed is mounted in a bearing point 10 which allows torsional vibrating movement. Therefore, torsion springs 11 and 12 are mounted with one end on connecting webs 8 and 9 and with the other end at bearing point 10. Oscillating structure 5 is designed with mirror symmetry with respect to the longitudinal axis of the torsion springs. Oscillating structure 5 is thus in a suspended state where it is supported only by bearing point 10.

When seen in the top view, seismic masses 6 and 7 have a flat annular sectored structure, with the spatial dimensions corresponding to those of a flat disk. Comb structures 14 are provided on sector limits 13 and mesh with other comb structures 15, forming an electrostatic drive 16, for example. Electrostatic drive 16 induces an oscillating rotational movement of oscillating structure 5 about bearing point 10, resembling the action of a mechanical watch. The frequency of torsional oscillation is preferably 3000 $s^{-1}$. Below seismic masses 6 and 7 are mounted electrodes 17 and 18, shown with dotted lines, with an electrically insulating air gap (not shown here) being provided between seismic masses 6 and 7 and electrodes 17 and 18, respectively. An electrical connection with an analyzer unit (not shown here in FIG. 1), which preferably also supplies power to electrostatic drive 16 over electrode 19, is provided for electrodes 17 and 19 over contacts 20, with a reference mass being provided over bearing point 10, for example.

Acceleration sensor 3 includes another seismic mass 21, which is suspended on flexible elements 22 so that it can be deflected in one direction, with seismic mass 21 being suspended over substrate 4. Seismic mass 21 with a comb structure 23 on it forms an oscillating structure 25, with comb structure 23 meshing with another comb structure 24. Opposing fingers 26 and 27 of comb structures 23 and 24 form an electrode pair (analysis device 41), with contacting of fingers 26 being provided over contact 28 and contacting of fingers 27 being provided over contact 29. Contacts 28 and 29 are preferably electrically connected to an analysis device (not shown here).

This yields the following function. Electrostatic drive 16 of rotational speed sensor 2 induces the rotational oscillation described above in oscillating structure 5, it should be pointed out here that the rotational oscillation is a planar movement. Due to the fact that this rotational oscillation is planar, the air gap between seismic mass 6 and electrode 18 is of the same size as that between seismic mass 7 and electrode 17, so that there is the same capacitance between electrodes 17 or 18 and the respective seismic masses 6 and 7, respectively. This shows clearly that the arrangement of electrodes 17 and 18 preferably below seismic masses 6 and 7 represents suitable capacitive analysis means 42 which can be sampled by a suitable analyzer unit. If a rotational speed is acting on acceleration sensing device 1 and thus on rotational speed sensor 2 and therefore Coriolis forces are acting on them, oscillating structure 5 goes from its planar rotational oscillation into a three-dimensional tilting rotational oscillation. Thus, there is a change in the air gap between electrodes 17 and 18 and the respective seismic masses 6 and 7, and therefore there is also a change in capacitance. For example, the air gap between seismic mass 6 and electrode 18 can decrease and at the same time the air gap between seismic mass 7 and electrode 17 can increase and vice versa. The resulting change in capacitance of analysis means 42 can be detected by the analyzing unit. The magnitude of the periodic change in capacitance is a measure of the magnitude of the Coriolis forces acting and thus of the rotational speed dα/dt, which yields the angle of rotation by integration:

$$\alpha = \int_T \frac{d\alpha}{dt} \cdot dt$$

The sensing direction for rotational speed sensor 2 is indicated by arrow 30.

If an acceleration acts on acceleration sensor 3, seismic mass 21 is deflected. This yields, for example, a change in capacitance between an electrode pair (analysis means 41) formed by fingers 26 and 27. This change in capacitance can be detected by an analyzer unit (not shown here) which is connected to contacts 28 and 29. The arrangement of flexible elements 22 provides a sensing direction as indicated by double arrow 31.

Due to the possible sensing directions represented by arrows 30 and 31, it is possible with an appropriate arrangement of acceleration sensing device 1 on a motor vehicle, for example, to determine the position of the vehicle from the acceleration sensor signal, while at the same time reliably detecting an incipient roll-over from the rotational speed sensor signal. Therefore, acceleration sensing device 1 is mounted in a motor vehicle in such a way that the sensing direction of rotational speed sensor 2 (arrow 30) runs in the direction of the longitudinal axis of the motor vehicle, with torsion springs 11 and 12 being arranged perpendicularly to the longitudinal axis, for example. Due to the joint arrangement of acceleration sensor 3 and rotational speed sensor 2 on substrate 4, there results an alignment of acceleration sensor 3 such that when the vehicle is tilted about its longitudinal axis, acceleration g due to gravity can be sensed (double arrow 31). This yields an acceleration a which can be sensed by acceleration sensor 3 when the vehicle is tilted about the longitudinal axis by the angle of inclination α as follows:

$$a = g \cdot \sin \alpha.$$

The acceleration a sensed is thus a measure of the position of the motor vehicle. For example, the position of the vehicle can change due to the fact that the vehicle is tilted about its longitudinal axis while turning. Due to the fact that the output signal of acceleration sensor 3 is averaged over a low-pass filter element (component of the analyzer unit) with a time constant of 1 s≦T≦30 s, preferably T=10 s, interfering acceleration (vibration, bumps) due to unevenness in the roadway surface is suppressed. Acceleration sensor 3 thus supplies a signal to a controller (not shown here) indicating the "average" position of the vehicle.

However, if the vehicle is inclined very rapidly about its longitudinal axis, e.g., at the start of a roll-over due to an accident, rotational speed sensor 2 responds with a change from planar rotational oscillation of oscillating structure 5 into a tilting rotational oscillation whose amplitude is always proportional to the instantaneous rotational speed.

Therefore, as already described, the capacitance of the electrode arrangement (seismic masses 6 and 7 with the respective electrodes 17 and 18) changes. Consequently, the amplitude of the periodic change in capacitance is a measure of the angular velocity Ω, which also reflects the angular velocity of the inclination process. The angular velocity Ω can be determined very rapidly (ms range) by angular integration in conjunction with the low-pass-filtered position signal of acceleration sensor 3 through an integrator element, for example, with a coupled high-pass filter (component of the analyzer unit) for offset suppression. This equation can be represented mathematically as follows:

$$\alpha = \int_T \Omega \, dt = \int_T \frac{d\alpha}{dt} dt,$$

the zero point (initial condition) of the integrator being supplied by acceleration sensor 3. The angle of inclination a thus determined is sent to the controller (not shown) and can be a deployment criterion for a seatbelt tensioned and/or airbag, e.g., when the resulting angle of inclination of the vehicle about the longitudinal axis assumes a value such that it can be assumed that the vehicle is already on its side or has entered a supercritical position. It is of course also conceivable to use the angular velocity Ω as another deployment criterion with the controller extrapolating from the (integrated) angle information and the instantaneous angular velocity whether or not the vehicle still has a chance of returning to a stable position or if it is already beginning to roll over.

On the basis of FIGS. 2 and 3, which are merely simplified diagrams of acceleration sensing device 1, particulars resulting from different manufacturing methods will be discussed.

Figure 2:
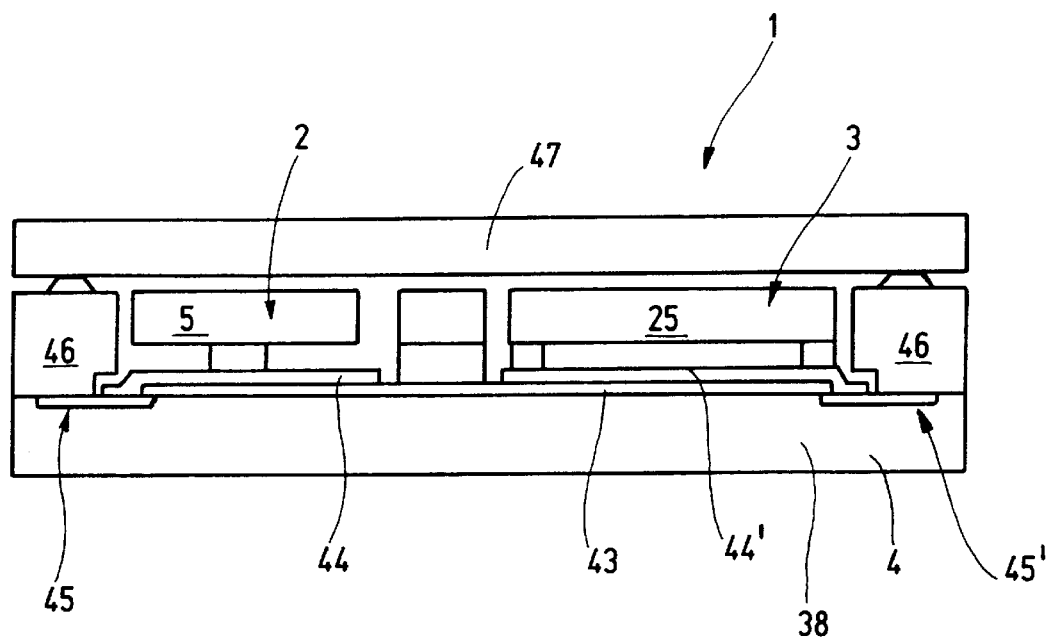
FIG. 2 shows a sectional view of the acceleration sensing device.

The acceleration sensing device 1 in FIG. 2 is mounted on substrate 4, as mentioned above. Substrate 4 is made of silicon in particular and has an insulation layer 43 which is partially covered by a conductive layer 44 and 44'. In a manufacturing process, printed conductors (not shown) were created from conductive layers 44 and 44'. These printed conductors create an electrical connection between the sensors (rotational speed sensor 2 and acceleration sensor 3) and a microelectronic circuit formed in substrate 4, in particular analyzer unit 38. Conductive layers 44 and 44' in particular are connected to analysis means 41 and 42, respectively (not shown in FIG. 2). This makes it possible in an advantageous manner to connect analysis means 41 and 42 to a microelectronic circuit embedded in substrate 4, as mentioned above, by way of buried layers 45 and 45', respectively. In particular, the microelectronic circuit represents the complete processing equipment for the output signals of the sensors. Thus, a one-chip design is implemented. Oscillating structures 5 and 25 illustrated in FIG. 2 are created here from a silicon layer applied to conductive layers 44 and 44', respectively, in a manufacturing process. A cover 47 is applied, at a distance from oscillating structures 5 and 25, to frame parts 46 provided for the sensors. However, cover 47 forms a hermetic seal. A detailed description of the manufacturing process by which the acceleration sensing device 1 according to FIG. 2 is manufactured can be found, for example, in U.S. Pat. No. 5,756,901 (corresponding to German Patent No. 195 37 814.8), the disclosure of which is hereby incorporated by reference herein.

Figure 3:
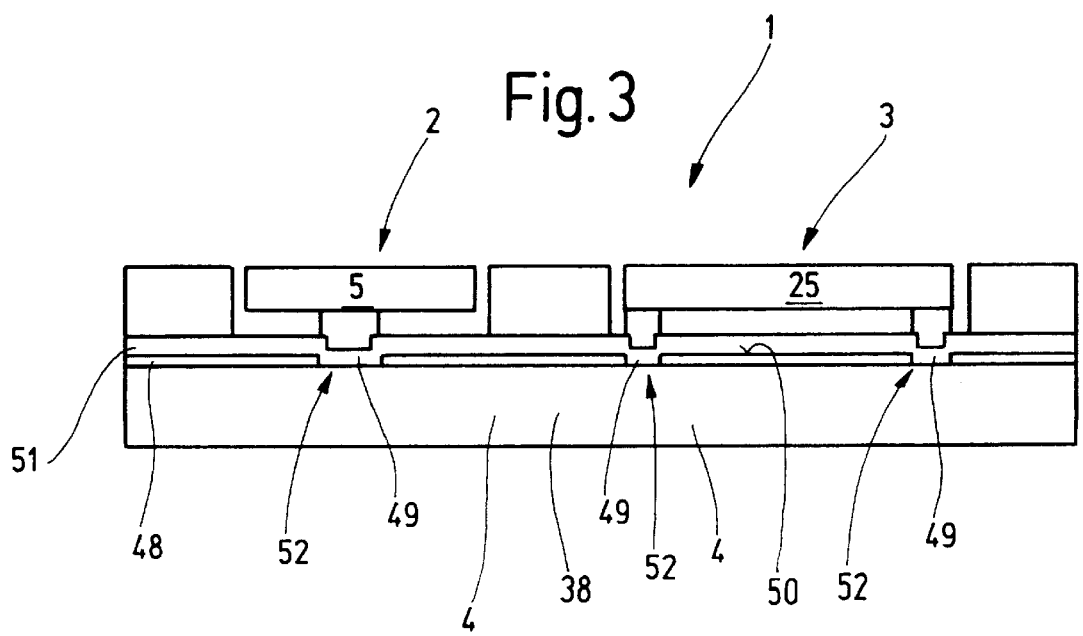
FIG. 3 shows another sectional view of the acceleration sensing device which, unlike the embodiment according to FIG. 2, is designed by additive integration technique.

FIG. 3 shows acceleration sensing device 1, although it is manufactured by a different manufacturing method than the embodiment according to FIG. 2. Acceleration sensing device 1 is applied to a substrate 4, which is preferably made of silicon. In the course of the manufacturing process, an IC passivation layer 48, which is interrupted in individual areas 49, is applied. A metal layer 51, preferably chromium, is deposited on IC passivation layer 48 and cutout areas 49, covering the entire surface 50 of IC passivation 48 and substrate 4 in areas 49. Metal layer 51 is produced by sputtering, for example. In areas 49, metal layer 51 forms contact pads 52. In several process steps, rotational speed sensor 2 and acceleration sensor 3 are applied to metal layer 51. The sensors (rotational speed sensor 2 and acceleration sensor 3) are also represented only in a simplified manner by oscillating structures 5 and 25 in FIG. 3. Analysis means 41 and 42 (not shown in FIG. 3) of the sensors are connected via contact pads 52 to a microelectronic circuit, in particular analyzer unit 38, incorporated into substrate 4. In the related art, this embodiment is known as additive integration technology. With regard to the manufacture of acceleration sensing device 1, the disclosure of U.S. Pat. No. 5,595,940 (corresponding to German Patent No. 44 18 163) is hereby incorporated by reference herein. FIG. 3 also shows acceleration sensing device 1 in a one-chip design. Of course, two-chip embodiments of acceleration sensing device 1 are also conceivable, so that the sensors are designed on one chip each, separately from the electronic circuit.

It is therefore clear that the acceleration sensing device 1 according to the present invention is a sensor system which supplies accurate information on the position of the vehicle by means of acceleration sensor 3 and rotational speed sensor 2 at any time, with both fast and slow changes in position being detected accurately and without impairment by interference signals. This permits an implementation of a roll-over sensor which meets the safety requirements of modern safety systems in an advantageous manner.

What is claimed is:

1. An acceleration sensing device, comprising:
    a rotational speed sensor for detecting a rotational speed, the rotational speed sensor being mounted on a substrate, the rotational speed sensor including at least one oscillating structure, the at least one oscillating structure including a first seismic mass, the first seismic mass being plate shaped and being capable of oscillating around an axis perpendicular to a first plane containing the first seismic mass; and
    an acceleration sensor for detecting a linear acceleration, the acceleration sensor including at least one second seismic mass suspended on flexible elements, the at least one second seismic mass being plate shaped,
    wherein the first seismic mass and the at least one second seismic mass are independently deflectable,
    wherein, in response to a rotation, the first seismic mass is deflected in a direction substantially parallel to the axis perpendicular to the first plane, and
    wherein, in response to the linear acceleration, the at least one second seismic mass is deflected within a second plane containing the at least one second seismic mass.

2. The acceleration sensing device according to claim 1, further comprising:
    a first analysis device coupled to the rotational speed sensor; and
    a second analysis device coupled to the acceleration sensor,
    wherein the first analysis device supplies first output information as a function of a deflection of the first seismic mass, and
    wherein the second analysis device supplies second output information as a function of a deflection of the at least one second seismic mass.

3. The acceleration sensing device according to claim 1, wherein the rotational speed sensor and the acceleration sensor form a roll-over sensor.

4. The acceleration sensing device according to claim 2, wherein the first output information and the second output information are provided to an analyzing unit.

5. The acceleration sensing device according to claim 2, wherein the first analysis device includes a first capacitive analysis element, and wherein the second analysis device includes a second capacitive analysis element.

6. The acceleration sensing device according to claim 4, wherein the first output information and the second output information are processed.

7. The acceleration sensing device according to claim 6, further comprising an electronic filter element for processing the second output information, the electronic filter element having an electronic filter output.

8. The acceleration sensing device according to claim 7, wherein the electronic filter element is a low-pass filter element.

9. The acceleration sensing device according to claim 8, wherein a time constant $T_t$ of the low-pass filter element is $1\ s \leq T_t \leq 30\ s$.

10. The acceleration sensing device according to claim 6, further comprising an integrator element for processing the first output information coupled to a high-pass filter, the integrator element having an integrator output.

11. The acceleration sensing device according to claim 10, wherein a time constant $T_h$ of the high-pass filter is $1\ s \leq T_h \leq 100\ s$.

12. The acceleration sensing device according to claim 8, further comprising:
    an integrator element for processing the first output information coupled to a high-pass filter, the integrator element having an integrator output;
    wherein the electronic filter output and the integrator output are provided to the analyzing unit.

13. The acceleration sensing device according to claim 12, wherein the analyzing unit detects the electronic filter output and the integrator output in a multiplex operation.

14. The acceleration sensing device according to claim 12, wherein the rotational speed sensor, the acceleration sensor, and the analyzing unit are each arranged on the substrate.

15. The acceleration sensing device according to claim 14, wherein the rotational speed sensor, the acceleration sensor and the analyzing unit are fully integrated on the substrate by additive integration technology.

16. The acceleration sensing device according to claim 12, wherein the electronic filter output supplies an average position of a vehicle as analog information free of rapid interfering pulses.

17. The acceleration sensing device according to claim 12, wherein information on a position of a vehicle is supplied to the integrator element as an initial integration condition.

18. The acceleration sensing device according to claim 12, further comprising a controller for numerically processing the electronic filter output and the integrator output.

* * * * *